UNITED STATES PATENT OFFICE 2,395,385

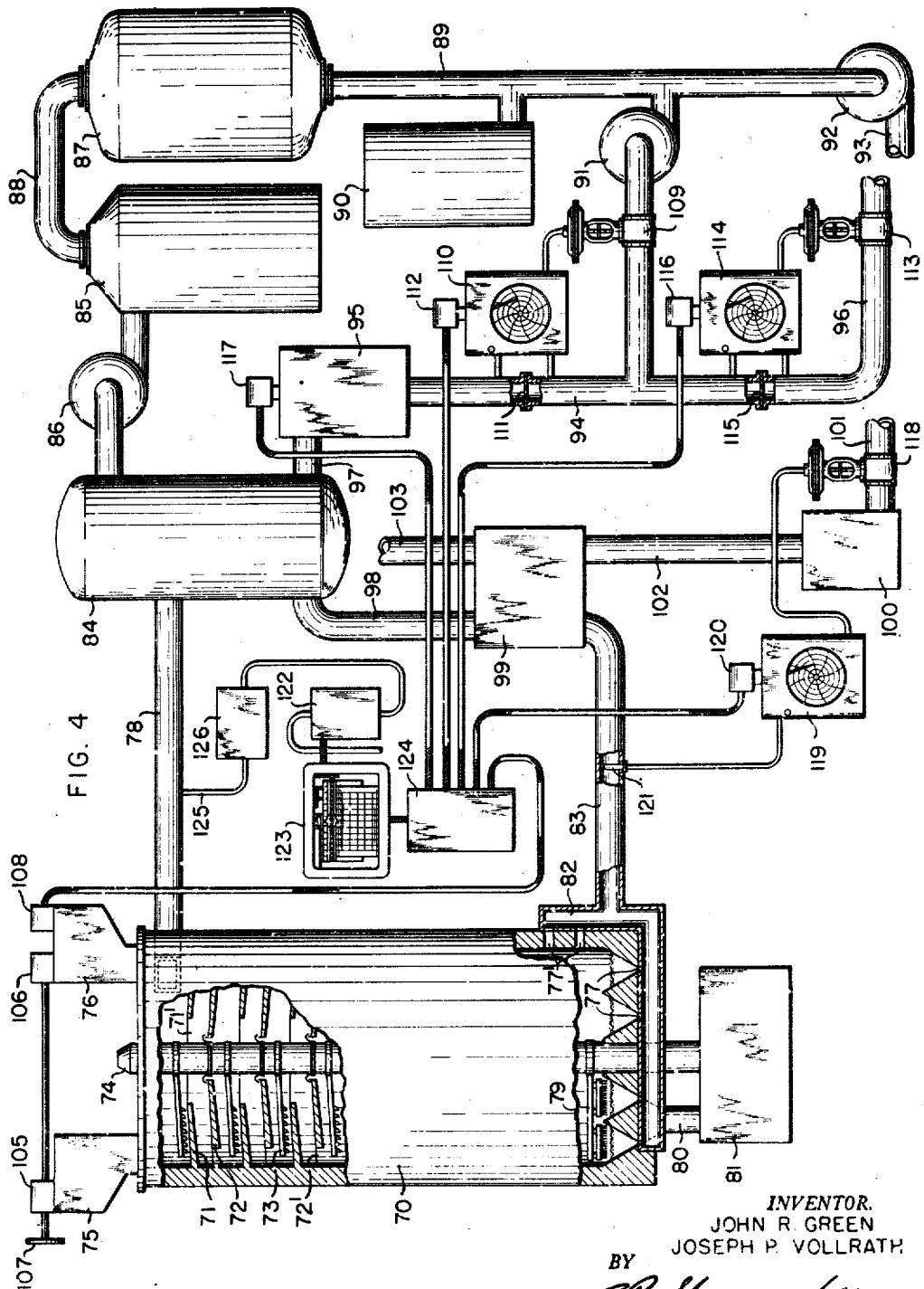

METHOD AND APPARATUS FOR CONTROLLING REDUCTION FURNACES

John R. Green, Mount Lebanon, and Joseph P. Vollrath, Glenside, Pa., assignors to The Brown Instrument Company, Philadelphia, Pa., a corporation of Pennsylvania Application November 13, 1943, Serial No. 510,124

8 Claims. (Cl. 75—41)

The general object of the present invention is to provide an improved method of and improved apparatus for controlling the operation of an ore reduction furnace. More specifically the object of the invention is to provide a method of and means for controlling the operation of an ore reduction furnace by and in response to variations in the value of a property or condition of the gas leaving the furnace which can readily be measured continuously and which provides a reliable indication of the reducing capacity of the furnace atmosphere, and of the corrective steps which should be taken when that capacity is impaired. The invention is of especial utility in controlling the operation of iron ore reducing furnaces making use of both hydrogen and carbon monoxide as significant reducing agents.

One characteristic or property of the exit gas well adapted for measurement for control purposes in accordance with the present invention, is the thermal conductivity of the gas. Ordinarily in reducing iron ore under steady operating conditions in any particular furnace the thermal conductivity of the furnace exit gas will have a particular or optimum value when the operating efficiency is at a practical maximum. Ordinarily, under such steady operating conditions, an increase or decrease in the thermal conductivity of the furnace exit gas will indicate a decrease in the efficiency of the furnace resulting from a change in the reduction capacity of the furnace atmosphere and which can be corrected by furnace adjustments dependent on the direction of departure of the thermal conductivity from its optimum value and tending to restore that value.

Control of a reduction furnace of the general type specified in response to the thermal conductivity of the exit gas is practically effective, we believe, because in the regular operation of such a furnace the thermal conductivity of the exit gas changes significantly only as a result of changes in the hydrogen and carbon dioxide constituents of the gas. Other exit gas constituents which may significantly effect the exit gas thermal conductivity, such as nitrogen, carbon monoxide and oxygen all have about the same thermal conductivity as air, whereas the thermal conductivity of hydrogen is much higher, and the thermal conductivity of carbon dioxide is substantially lower than that of air. Furthermore, while carbon dioxide is not a reducing agent, it varies in substantial inverse accordance with the carbon monoxide content of the furnace exit gas under usual operating conditions, since in the regular operation of any particular furnace, the carbon oxide content ($COCO_2$) of the exit gas will be approximately constant.

In regulation in accordance with the present invention, on an increase in the thermal conductivity of the exit gas above its optimum value, corrective furnace adjustments are made to lower the reducing capacity of the furnace atmosphere by reducing its hydrogen content, and/or increasing its $CO_2$ content and thereby decreasing the CO content. Conversely, when the thermal conductivity decreases below its optimum value, corrective adjustments are made to increase the hydrogen content and/or to decrease the $CO_2$ content of the furnace gas.

The thermal conductivity of the exit gas is not the only gas property or characteristic suitable for measurement for control purposes in accordance with the present invention. For example, under steady operating conditions, the density of the exit gas from any particular reduction furnace has an optimum value when the furnace efficiency is at a practical maximum and variations in the exit gas density require corrective furnace adjustments analogous to those required when the thermal conductivity of the exit gas falls below and rises above the optimum thermal conductivity. The gas density provides a reliable indication of the reducing capacity of the furnace atmosphere because the molecular weights of carbon monoxide and nitrogen do not differ markedly from one another or from the average molecular weight of the gaseous constituents of air, whereas the molecular weight of carbon dioxide is substantially higher and the molecular weight of hydrogen is much smaller than said average molecular weight.

In consequence, a variation in the density of the furnace exit gas indicates a variation in the reducing capacity of the furnace atmosphere. On a decrease in the density of exit gas below the optimum density value, furnace operations will be improved by decreasing the hydrogen content and by increasing the carbon dioxide content of the furnace gases. Conversely, when the density of the exit gas rises above the optimum density value, the proper corrective adjustments will increase the hydrogen content and decrease the $CO_2$ content of the gas.

The flame structure of a burning jet of gas varies with the composition of the gas, and when the burning consists wholly or in substantial part of the gas leaving a reducing furnace flame structure provides a measurable indication of the reducing character of the furnace atmosphere which may be used in regulating the operation of the furnace in accordance with the present invention.

The present invention is well adapted for use in controlling iron ore reduction furnaces of various types. In particular it is well adapted for use in controlling the operation of blast furnaces having special provisions, hereinafter described, for passing hydrogen into the furnace at a level well above the furnace fusion line. The invention is also well adapted for use in controlling so-called direct reduction furnaces in which hydrogen is employed as the sole or main reducing agent, and is especially well adapted for use in controlling the operation of a direct reduction furnace in which carbon as well as hydrogen is supplied to the furnace chamber.

The various features of novelty which characterize our invention are pointed out with particularity in the claims annexed to and forming a part of this specification. For a better understanding of the invention, however, the advantages and specific objects obtained with its use, reference should be had to the accompanying drawings and descriptive matter in which we have illustrated and described preferred embodiments of our invention.

Of the drawings:

Fig. 4 is a diagrammatic view illustrating the use of the invention in controlling the operation of a direct reduction furnace;

Figure 1:
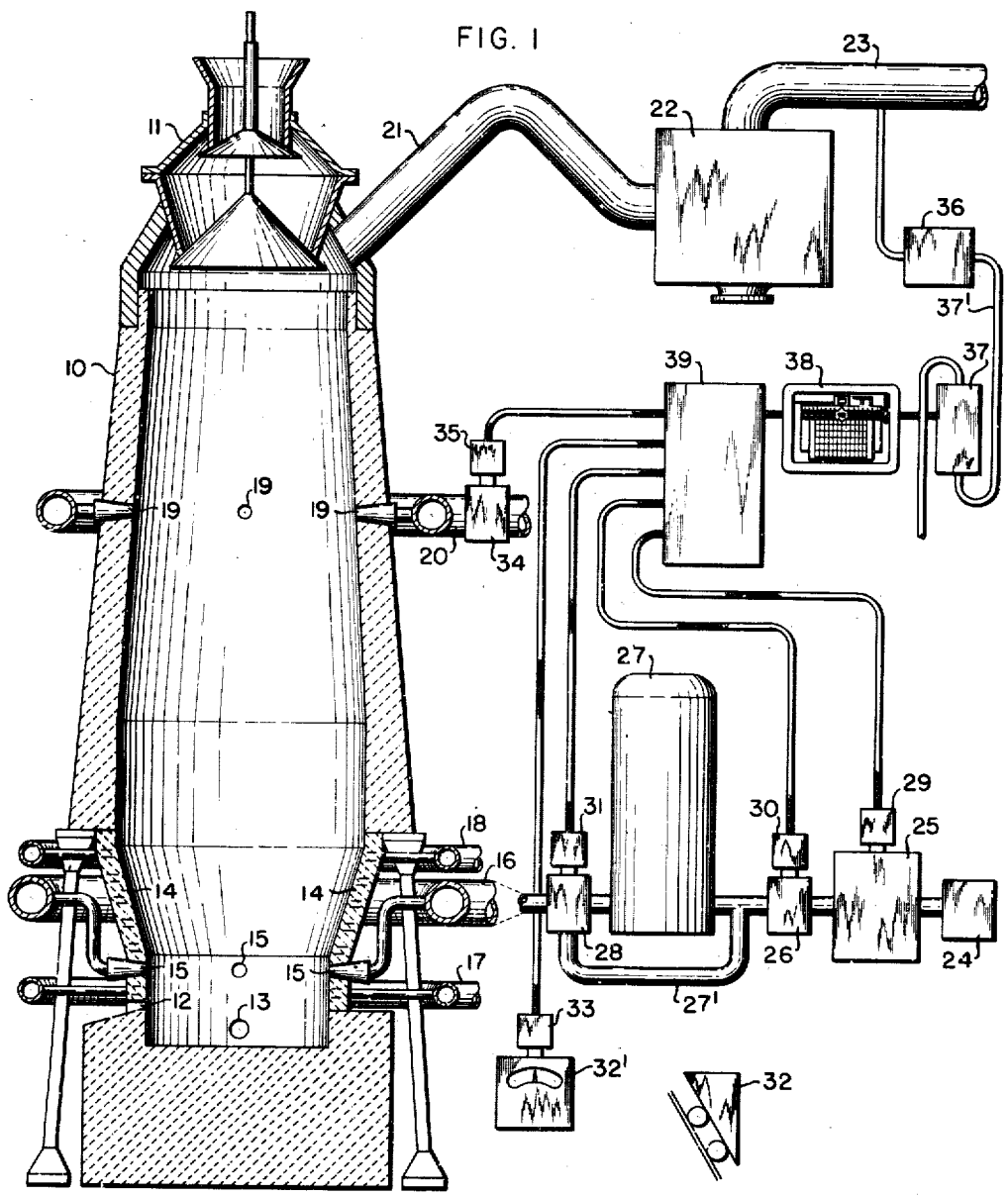
Fig. 1 is a diagrammatic view illustrating the use of the present invention in controlling the operation of a blast furnace.

In Fig. 1 we have illustrated the use of our invention in controlling the operation of a blast furnace 10 which is of conventional type and form except for its inclusion of special means for passing hydrogen gas into the stack as hereinafter described. The blast furnace is provided with the usual charging or feeding means 11 at its upper end and is provided at its lower end with a hearth having a cinder notch 12, and molten metal tap hole 13, and with water cooled bosh plates 14 and tuyères 15. Cooling water is supplied to and exhausted from the water cooled tuyères and bosh plates by piping 17 and 18. The tuyères are supplied with preheated air or "hot blast" through a bustle pipe or manifold 16. Special inlets 19 through which hydrogen is passed into the furnace are shown as arranged substantially midway between the upper and lower ends of the blast furnace masonry stack and are supplied with hydrogen through a bustle pipe 20. In ordinary practice the hydrogen thus supplied to the furnace will be the hydrogen constituent of some available gaseous mixture, ordinarily coke oven gas, which is rich in hydrogen. The hydrogen content of ordinary coke oven gas is between 55 and 60% by volume. The gas discharged from the furnace passes from the upper end of the blast furnace through a pipe 21 into prising a dust remover 22 and usually comprising other conditioning devices to which the gas passes from the dust remover 22 through the pipe 23. Such other conditioning devices are not shown in Fig. 1, but ordinarily comprise gas cooling and cleaning apparatus including a gas washer in which, as is explained in connection with Fig. 4, much of the water vapor in the gas is condensed and some of the carbon dioxide is washed out of the gas.

In respect to all of its features above mentioned, other than the hydrogen inlets 19 and pipe 20, the blast furnace shown in Fig. 1 is of the conventional type and form. Furthermore, said blast furnace is capable of operation in the most usual manner when the supply of hydrogen to the inlets 19 is interrupted. The hot blast air supplied to the tuyères 15 is passed into the bustle pipe 16 under suitable pressure by a blower or blowing engine 24 through a humidity regulating unit or device 25, a volume regulator 26, one or more hot stoves 27 and a bypass 27' about said stoves, and a hot blast temperature regulator 28. The latter is, in effect, a bypass control valve which is adjusted by a reversible control motor 31 to vary the relative portions of the blast air passing respectively through the hot stoves 27 and through the bypass pipe 27', and thus regulates the temperature of the mixture of heated and non-heated air passing to the bustle pipe 16 from the regulator 28.

The humidity regulator 25 may be adjusted by a reversible control motor 29 to increase or decrease the moisture content of the blast air. Usually, the general effect of the device 25 is to reduce the moisture content of the blast air more or less, but in blast furnace operation with a so-called "wet blast" the humidity regulator 25 may usually operate to increase rather than to decrease the blast moisture content. The volume regulator 26 is adjusted by a reversible control motor 30 as required to maintain the desired weight rate of blast air flow into the furnace. Iron ore, coke and limestone or other fluxing agent are supplied to the blast furnace tops or feeder 11 by a skip car 32, approximately at rates indicated to the operator as appropriate by an indicator 32' adjusted by a reversible motor 33. The rate at which coke oven gas or other hydrogen containing gas is supplied to the bustle pipe 20 is regulated by adjustment of a regulator 34 effected by a reversible motor 35.

As shown in Fig. 1, a small sample stream of gas passes continuously from the main 23 through gas treating means 36 and a pipe 37' to measuring apparatus 37. The sample conditioning apparatus 36 may well be or include an electrostatic precipitator, and as diagrammatically shown in Fig. 2 the measuring apparatus 37 comprises thermal conductivity test gas and standard gas cells 37a and 37b, respectively, connected in an electric bridge circuit having output terminals 37c and 37d. The measuring apparatus 37 operates to create between the bridge output terminals a minute voltage which varies in accordance with the thermal conductivity of the gas passing through the test cells 37a. This voltage is measured by a suitable voltage measuring device 38 and the latter operates through control apparatus 39 comprising a control panel and associated relay mechanism to operate each of the above mentioned reversible control motors 29, 30, 31, 33 and 35 in a direction and to the extent dependof the thermal conductivity of the test gas from a predetermined value thereof.

Figure 2:
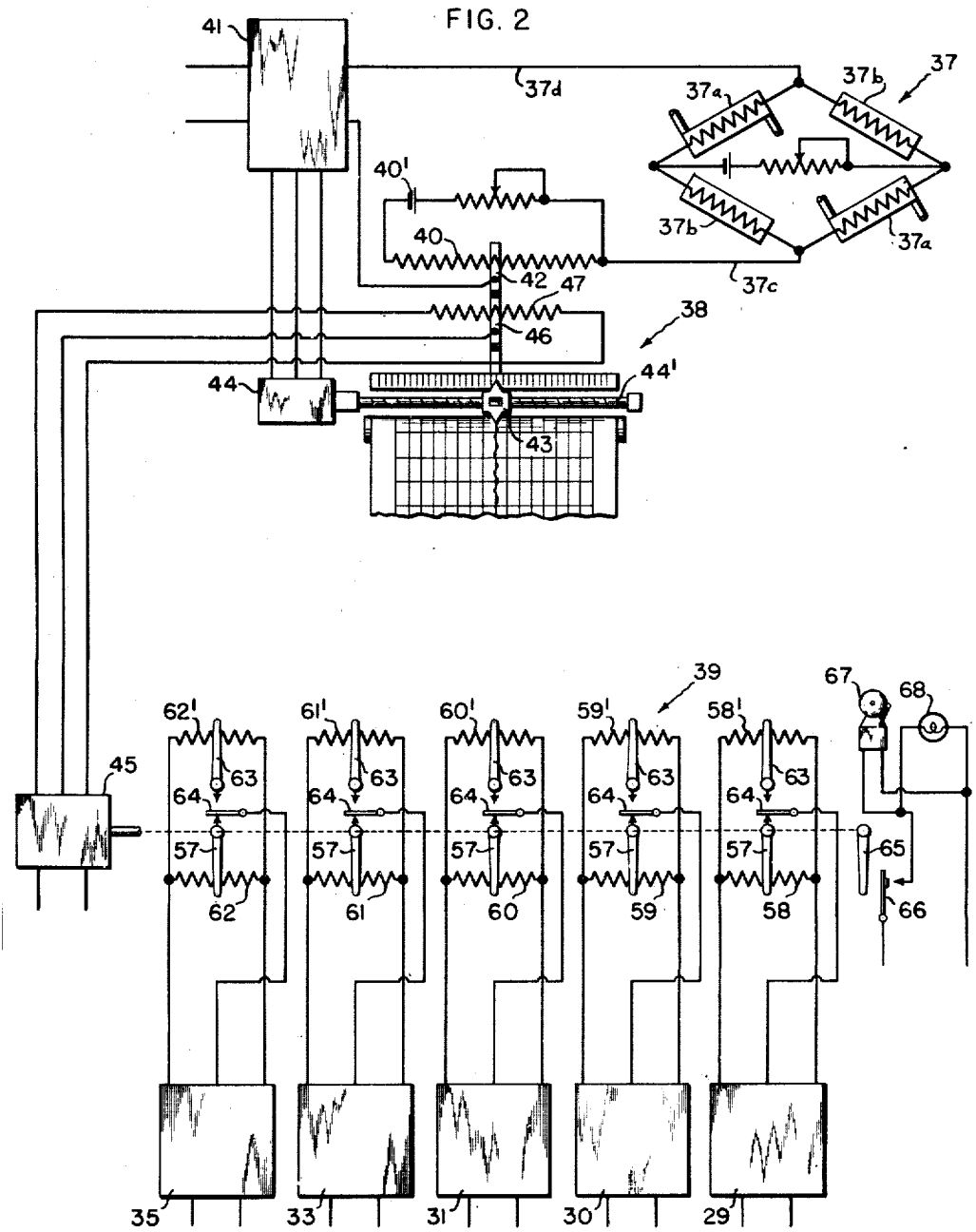
Fig. 2 is a diagram of electrical measuring and control portions of the apparatus shown in Fig. 1.

As shown diagrammatically in Fig. 2, the measuring device 38 is a self-balancing recording potentiometer instrument including a slide wire resistor 40 energized by a battery 40'. One end of the resistor 40 is connected to the bridge output terminal 37c, and the second bridge output terminal 37d is connected through the input circuit of an electronic amplifier 41 to a slider or adjustable contact 42 in sliding engagement with the resistor 40. As diagrammatically indicated in Fig. 2, the contact 42 is attached to and supported by the pen carriage 43 which is adjusted longitudinally of the resistor 40, and thereby adjusts the index and recording elements of the instrument 38, as well as the contact 42, when current flows in the output circuit of the bridge.

In the normal or balanced condition of the measuring apparatus, no current flows through the comparison cell bridge output circuit because the potential difference between the terminals 37c and 37d is then equal and opposite to the potential drop in the portion of the slide wire resistor 40 between the point at which it is engaged by the contact 42 and the point at which it is connected to the terminal conductor 37c. An increase or decrease in the potential difference between the bridge output terminals 37c and 37d unbalances the measuring apparatus and produces a corresponding current flow through the input circuit of the amplifier 41. The latter is thereby actuated to energize a reversible motor 44 for rotation in the direction and to the extent needed to rebalance the measuring apparatus.

That rebalancing operation is effected by the adjustment of the contact 42 along the resistance 40 as required to make the potential drop in the portion of that resistor at the right of the contact 42, as seen in Fig. 2, equal in magnitude and opposite in direction to the potential difference between the bridge terminals 37c and 37d. The operation of the motor 44 adjusts the pen carriage 43 and thereby the contact 42 longitudinally of the motor shaft 44' as a result of a threaded connection between said pen carriage and shaft.

The thermal conductivity measuring means 37 and associated potentiometer instrument 38 need not be further described as each may be of a known form now in commercial use. For example, the thermal conductivity measuring means may be of the type disclosed in the Harrison Patent 1,818,619, granted August 11, 1931, and the instrument 38 may be of the type disclosed in the patent application of Wills, Serial No. 421,173, filed December 1, 1941.

As diagrammatically shown in Fig. 1, the deflection of the pen carriage 43 effects a corresponding operation of each of the motors 29, 30, 31, 33 and 35 through a control system of known type and form. Said control system as diagrammatically illustrated, comprises a reversible electric motor 45 which is energized by the deflection of the pen carriage 43, for operation in a direction and to an extent determined by the direction and extent of said deflection. As shown by way of example in Figs. 2 and 3, the motor 45 is thus energized by virtue of its inclusion in an electric proportioning control system unit of well known form. Said unit comprises a control contact 46 carried by the pen carriage 43 and adjusted by the deflection of the latter along a slide wire resistor 47. The resistor 47 has its two terminals connected through coils 48 and 49, respectively, to the terminals of a second slide wire resistor 50. The resistor 50 is engaged by a follow-up contact 51 shown as in threaded engagement with the shaft of the motor 45 so as to be adjusted along the resistor 50 by the rotation of the motor. The bridge circuit including the resistors 47 and 50 and coils 48 and 49, is energized by supply conductors 52 and 53, respectively connected to the contacts 45 and 51. The motor 45 is energized from the supply conductors 52 and 53 for operation in one direction when a switch contact 54 is shifted out of its neutral position in one direction to engage a contact 55, or in the opposite direction into engagement with a second contact 56. The contacts 54 and 55 when in engagement close an energizing circuit for the motor 45 causing the latter to operate in one direction. Similarly the contacts 54 and 56 cooperate when in engagement to energize the motor 45 for rotation in the opposite direction.

The contact 54 is carried by the pivoted armature member 57 of an electromagnetic switch mechanism including the coils 48 and 49. When the control system, including the motor 45 is in its balanced condition, the contact 54 does not engage either of the contacts 55 and 56. When the system is unbalanced and the current flow through the coil 48 exceeds or is less than the current flow through the coil 49, the contact 54 is tilted into engagement with the contact 56 or 55, respectively. Said system is unbalanced by an adjustment of the contact 46 along the resistor 47. The rotation of the motor 45 resulting from such unbalance is in the direction to rebalance the system by equalizing the current flows through the coils 48 and 49 by its adjustment of the contact 51 along the resistor 50. The motor 45 continues to operate until the system is rebalanced and is then deenergized by the movement of the contact 54 into its neutral position.

The rotation of the motor 45 which thus adjusts the contact 51 as required to rebalance the controlling circuit for the motor, proportionately adjusts each of a plurality of control contacts 57 shown as in threaded engagement with the shaft of the motor 45. Each of the contacts 57 engages a corresponding one of a series of slide wire resistors 58, 59, 60, 61 and 62, respectively included in the individual control circuits for the motors 29, 30, 31, 33 and 35.

Figure 3:
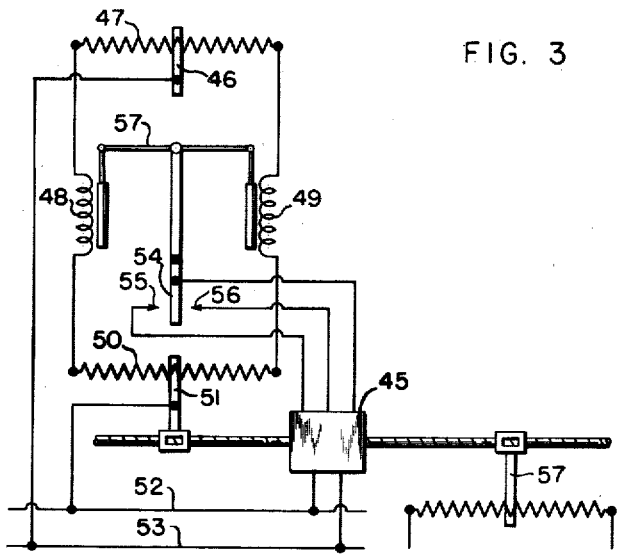
Fig. 3 is a diagram illustrating a proportioning control system included in the apparatus shown in Fig. 2.

Each of said individual control circuits may be like the circuit shown in Fig. 3, and may be similarly associated with the motors 29, 30, 31, 33 or 35 which it controls. As shown in Fig. 2, however, the individual control circuits for the last mentioned motors include slide wire resistors 58', 59', 60', 61' and 62', respectively connected in parallel with the resistors 58, 59, 60, 61 and 62. Each of said resistors 58'—62' is engaged by a manually adjustable contact 63 and a manually adjustable switch 64 in association with each contact 63 and the corresponding contact 57 is adjustable to disconnect the corresponding bridge energizing conductor from the contact 57 and connect it to the associated contact 63, so that the operation of the corresponding motor may then be manually controlled.

As shown in Fig. 2, the shaft of the motor 45 carries an arm 65 which actuates a switch 66 to ring an alarm bell 67 and light a signal lamp 68 on an abnormal upscale adjustment of the potentiometer control contact 46, such as might result from cooling water leakage into the hot lower portion of the furnace as the result of a broken bosh plate or tuyère.

In the contemplated normal use of the apparatus shown in Figs. 1, 2 and 3, under any particular set of operating conditions, the various regulators 25, 26, 28 and 34 and the indicator 32 are first adjusted into their respective conditions assumed to be those insuring such approximation to the maximum efficiency of operation as is practically obtainable in steady operation under the prevailing operating conditions. Such calibrating adjustments of the regulators are readily effected by use of the manually adjustable contacts 63. With the apparatus thus properly calibrated, it should operate continuously without change in efficiency, so long as operating conditions do not change. In practice, however, the maintenance of the same general operating conditions do not prevent minor condition variations which impair the reduction capacity of the blast furnace and correspondingly vary the thermal conductivity of the exit furnace gas passing through the test cells 37a. When the exit gas thermal conductivity increases above or falls below the predetermined or assumed optimum value the resultant adjustment of the pen carriage 43 moves the contact 46 along the resistor 47 and energizes the motor 45 to effect corrective adjustments tending to restore the normal thermal conductivity value.

As previously explained, when the thermal conductivity of the exit gas increases above the value assumed to be its optimum value, the corrective adjustments made should reduce the amount of hydrogen and carbon monoxide reducing agents in the furnace. Ordinarily the adjustments made to reduce the amount of hydrogen in the furnace comprise an adjustment of the regulator 34 directly reducing the rate at which hydrogen is passed into the furnace through the inlets 19, and an adjustment of the humidity regulator 25 which reduces the moisture content in the blast air and thus decreases the amount of hydrogen carried into the furnace in the form of water vapor. The adjustments ordinarily made to reduce the amount of carbon monoxide in the furnace comprise an adjustment of the regulator 26 to increase the volume of the draft and an adjustment of the indicator 32' to indicate that the coke-ore ratio of the furnace charges should be reduced. A decrease in the moisture content of the blast air tends to temporarily increase the maximum furnace temperature, and the regulator 28 should ordinarily be adjusted to reduce the temperature of the blast air when its moisture content is reduced. It is to be noted, however, that while a change in the moisture content of the blast tends to an immediate change in the furnace hearth temperature, the hearth temperature produced results in a variation in the carbon monoxide-carbon dioxide ratio which will substantially eliminate hearth temperature change within a comparatively short operating period, even though no compensating adjustment in the blast temperature is made. Adjustments of the regulators 25, 26, 28, 32' and 34 which are the converse of those just described, are made when the thermal conductivity of the test gas falls below the assumed optimum thermal conductivity.

On any change in general operating conditions, such as might result from a significant change in the character of the coke, iron ore, or fluxing agent charged into the furnace or in the rate of iron production, recalibration adjustments of the regulators will ordinarily be necessary so that the furnace control system will tend to maintain a new thermal conductivity value, assumed to be the optimum value for the changed operating conditions. The determination of the optimum thermal conductivity value for any new set of general operating conditions may well be based in part on past experience, in part on the assumptions as to the effect of the changes made in the operating conditions and in part upon an estimate of the exit gas composition considered desirable under the new conditions. Thus, for example, it may be determined or assumed that with a given general set of operating conditions, the maximum efficiency practically obtainable requires exit gas having the following composition by volume, namely, 12.5 parts of carbon dioxide, 25.4 parts of carbon monoxide, 3.5 parts of hydrogen and 58.6 parts of nitrogen and a small portion of other constituents which may be disregarded in this connection. The thermal conductivity of the exit gas constituents just enumerated are well known. On the assumption that at 32° F. the thermal conductivity of air is 1, the thermal conductivity at the same temperature of carbon dioxide is .586; of carbon monoxide is .927; of hydrogen is 6.99; and of nitrogen is 1.003. The thermal conductivity of a mixture of the constituents just named depends of course upon the percentages of the different constituents in the mixture. On the exit gas composition assumptions just made, the thermal conductivity of the composition is approximately 1.12.

In Fig. 4 we have illustrated the use of our present invention in the control of a direct reduction furnace 70 of the rabble furnace type comprising a vertical chamber within which are superposed stationary horizontal trays 71 formed with central openings 71' and superposed stationary horizontal trays 72 alternating with the trays 71 and formed with openings 72' at their peripheral edges. Associated with and above each of the trays 71, are corresponding rabble arms 73 carried by a rotating shaft 74. Ore to be treated in the furnace is fed into the upper end of the furnace at a suitable rate by an ore feeder 75. In accordance with the present invention, carbon which may be in the form of coke, or which in some cases, may be in the form of coal, is passed into the upper end of the furnace chamber at a suitable rate in admixture with the ore fed by the ore feeder 75, or as in the construction diagrammatically illustrated, by a carbon feeder 76 separate from the ore feeder 75.

The ore and carbon charge thus fed into the furnace is moved slowly down over the trays 71 and 72 by the rabble arms 73, which work each ore body successively downward through the alternating tray openings 71' and 72'. Hydrogen containing gas is passed into the lower portion of the furnace chamber through openings 77 in its bottom wall and openings 77' in its side wall. In the furnace chamber, the furnace gases including hydrogen, continuously flow upward from the lower end of the chamber through the successive tray openings 71' and 72', to a gas outlet 78 at the upper end of the furnace chamber.

The treated ore is moved out of the furnace at its lower end by gravitational action, supplemented by the action of sweeps 79 carried by the shaft 74, into a discharge chute 80 leading to receiving apparatus 81 below the furnace. The latter may comprise means for separating gangue from the deoxized ore and for briquetting the latter to minimize its reoxidization and to better adapt it for treatment in a melting furnace. The apparatus 81 may also include motor means for rotating the shaft 74. As the details of the apparatus 81 form no part of the present invention, they need not be illustrated in detail or further referred to herein.

The hydrogen containing gas passing into the furnace chamber through the openings 77 and 77' is supplied through a manifold 82 which receives gas through a pipe 83 at a rate and in a condition regulated as hereinafter described. Ordinarily, the bulk of the gas passed to the furnace through the supply pipe 83, is gas which has passed out of the furnace through its gas outlet 78 and has thereafter passed through suitable conditioning apparatus. The conditioning apparatus illustrated diagrammatically by way of example in the accompanying drawings, comprises a heat exchanger 84, a gas washer 85 to which gas is passed from the heat exchanger 84 by a booster pump 86, and a precipitator 87. The latter receives washed gas from the gas washer 85 through a conduit 88 and discharges the gas into a distribution pipe 89. The cooling and cleaning actions to which the gas is subjected in passing through the heat exchanger 84, gas washer 85 and precipitator 87, eliminate some of the carbon dioxide, much of the water vapor and practically all of the dust contained in the gas as it passes away from the furnace.

As shown, gas may pass from the distribution pipe 89 to a gas holder 90 and to the inlets of booster pumps 81 and 92. The pump 92 may supply gas through its outlet pipe 93 to any apparatus in which the gas may be used advantageously. The pump 91 supplies gas at a rate regulated as hereinafter described to the inlet pipe 94 of a humidity regulator 95. The latter may also receive hydrogen containing gas from a make-up gas supply pipe 96. The gas passing through the humidity regulator 95 is delivered to the inlet 97 of the heat exchanger 84, and passes away from the latter through the heat exchanger outlet 98 to a gas heater or preheater 99 from which the gas passes to the furnace supply pipe 83. The gas thus passing through the heat exchanger between its inlet 97 and outlet 98 absorbs heat from the furnace exit gas drawn through the heat exchanger by the pump 86. The gas thus passing through the preheater 99 absorbs heat from hot products of combustion of fluid fuel burning in a furnace chamber 100; said fuel, which may be gas supplied at a regulated rate by the pipe 83, is passed into the chamber 100 through a pipe 101. Products of combustion pass from the chamber 100 to the gas heater 99 through a pipe 102, and pass away from the heater 99 through a stack connection 103.

In the contemplated operation of the apparatus shown in the drawings, ore and carbon are fed into the furnace 70 by the feeders 75 and 76, respectively, at suitable rates. As diagrammatically shown in the drawings, the feed rates of the feeders 75 and 76 may be simultaneously and proportionally adjusted through regulators 105 and 106, respectively, by the angular adjustment of a manually rotatable control element 107. The ratio of the carbon and ore feed rates which the regulating elements 105, 106 and 107 tend to maintain, can be varied by means of a control element 108 which by its adjustment varies the rate at which carbon is fed by the feeder 76 in any particular adjustment of its regulator 106.

The rate at which hydrogen containing gas is passed into the furnace through the manifold 82, is directly regulated by a fluid pressure motor valve 109 in the outlet pipe of the blower 81. As shown, the valve 109 is adjusted to vary the gas flow from the blower 81 to the humidity regulator 95, by a flow meter 110 responsive to the pressure drop of the gas flowing through a measuring orifice 111 in the pipe 94. The flow meter 110 adjusts the valve 109 as required to maintain at the orifice 111 a pressure drop determined by a control element 112 which may be adjusted to vary said pressure drop and thereby the rate of gas flow through the pipe 94. The rate at which make-up gas is passed into the pipe 94 by the pipe 96, is regulated by a fluid pressure motor valve 113 which is controlled by a flow meter 114 responsive to the pressure drop at a measuring orifice 115 in the pipe 96. The flow meter 114 adjusts the valve 113 as required to maintain a pressure drop at and flow through the orifice 115 which is determined by the adjustment of a control element 116.

The humidity controller 95 is adapted to operate to increase or decrease the moisture content of the gas passing through it as required to maintain that content at a value determined by a control element 117 which may be adjusted to vary said content. The temperature at which the gas passes away from the heater 99 is controlled by the adjustment of a fluid pressure motor valve 118 in the fuel supply pipe 101 for the combustion chamber 100. The valve 118 is automatically adjusted by a control pyrometer 119 responsive to a suitable controlling temperature which may be the temperature in the combustion chamber 100 or, as shown, the temperature of a thermocouple 121 in the outlet 83 of the gas preheater 99. The control pyrometer 119 tends to maintain a gas temperature which is predetermined and may be varied by adjustment of a control ement 120.

In the normal, intended operation of the furnace shown in Fig. 4, iron ore, ordinarily hematite ($Fe_2O_3$), or magnetite ($Fe_3O_4$), and carbon are fed into the upper end of the furnace chamber and hydrogen containing gas is passed into the lower end of the furnace chamber at suitably related rates. As shown the rates at which ore and carbon are supplied to the furnace may be varied by adjustment of the regulating device 107, and the rate at which carbon is supplied may be independently regulated by the control element 108. The rate at which hydrogen containing gas is passed into the furnace is subject to regulation by the control element 112. The gas supplied to the furnace through the inlets 77 and 77' may well be preheated to a temperature of about 800° C. As a result of such preheating and the exothermic reducing actions effected in the furnace chamber, a temperature of about 800° C. is maintained in the lower end of the furnace chamber. Those reducing actions convert large portions, at least, of the iron oxide ores into metallic iron. The reduction is effected partly by carbon monoxide, but mainly by hydrogen with a resultant formation of water vapor. The latter is continuously being decomposed in the furnace by reaction with carbon, with a resultant formation of free hydrogen ($H_2$) and carbon monoxide (CO) and/or carbon dioxide ($CO_2$).

The exit gas leaving the furnace chamber through the outlet 78 includes free hydrogen, water vapor, carbon monoxide, and carbon dioxide. A suitable relation between the rates at which ore and carbon are supplied to the upper end of the furnace and the rate at which reducing gas is supplied to the lower end of the furnace, and the inclusion of a suitable free hydrogen content in said reducing gas are necessary to the maintenance of the desired operating conditions. With the particular arrangement shown those conditions may be regulated by suitable adjustments of the control elements 108, 112 and 117. They could be maintained without use of the element 117 if the humidity regulator 95 were omitted and the gas washer 85 were operated to maintain a substantially constant moisture content in the gas leaving it. Advantageously, the rate at which make-up gas is supplied through the pipe 96, and the temperature at which the hydrogen containing gas is supplied to the furnace are subject to adjustment of the control elements 116 and 120, respectively.

In the form of our invention illustrated in Fig. 4, each of the control elements 108, 112, 116, 117 and 120 is a reversible electric motor, and each of said motors is controlled by measuring apparatus 122 through a control instrument 123 and control apparatus 124 which may be respectively identical with the measuring apparatus 37, control instrument 38 and control apparatus 39 of Figs. 1 and 2. As shown in Fig. 4, a sample stream of gas is passed continuously to the measuring apparatus 122 from the furnace outlet 78, through a pipe 125 and a suitable gas conditioning apparatus 126 like or analogous to the conditioner 36 of Fig. 1.

For operation at maximum practical efficiency under any given set of general operating conditions, the thermal conductivity of the exit gas measured by the measuring apparatus 122 will have a certain assumed optimum value which can be determined empirically, or as a result of past experience, observations and assumptions based on the furnace operating conditions. However, the assumed optimum thermal conductivity value be determined, the control apparatus 124 is adapted to maintain or tends to maintain, that value by actuating the motors 112, 117 and 108 to decrease and increase the rates at which hydrogen and carbon are supplied to the furnace as the thermal conductivity of the exit gases increases and decreases respectively, and by operating the motor 120 to increase and decrease the temperature of the hydrogen containing gas supplied to the furnace as the moisture content of that gas is decreased and increased. As those skilled in the art will recognize, general advantages of the present invention are obtainable without the use of all of the various control elements shown in Fig. 1 and in Fig. 4 as automatically controlled reversible motors.

The introduction of carbon into the furnace 70 provided for in Fig. 4, forms no part of our joint invention but is disclosed and claimed in the copending sole application, Serial No. 510,125, filed of even date herewith by John R. Green, one of the joint applicants herein. It is to be noted, moreover, that the omission or non-use of the coke feeder 76 shown in Fig. 4 will not interfere with the attainment of the general advantages of the present invention when used to control the operation of the furnace shown in Fig. 4.

The provisions in a blast furnace of means for supplying hydrogen to the furnace in the manner in which it is supplied to the inlets 19 shown in Fig. 1, forms no part of the invention claimed herein, but is included in the invention disclosed and claimed in the sole application Serial No. 510,125, filed of even date herewith by the said John R. Green. The omission or non-use of the supply of hydrogen containing gas in the blast furnace of Fig. 1 will not interfere with the attainment of the general advantages of the present invention when used to control the operation of a conventional blast furnace.

Figure 5:
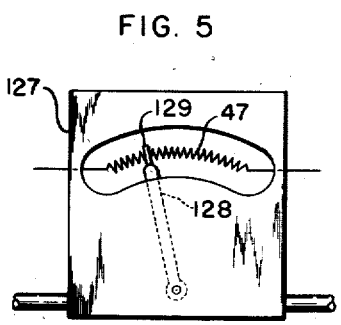
Fig. 5 is a diagrammatic view illustrating a modification of apparatus shown in Fig. 2.

As previously pointed out, the thermal conductivity of the exit gas is not the only property or characteristic of that gas which can be readily measured continuously, and the measure of which forms a measure of the reduction capacity of the furnace which can be utilized in adjusting the furnace to approximate the maximum practical efficiency. As will be apparent from a consideration of their molecular weights, the density of carbon dioxide is appreciably greater and the density of hydrogen is appreciably smaller than the density of other gaseous constituents present in significant amounts in the exit gases of the furnaces shown in Figs. 1 and 4. In consequence, when either of the furnaces shown in Figs. 1 and 4 is controlled in accordance with the present invention, the hydrogen and carbon monoxide contents of the furnace gases should be increased on an increase in the exit gas density, and should be reduced on a decrease in the density of the exit gas. Various meters for measuring a density of gases are available for use in such a control system as is shown in Fig. 2, in lieu of the potentiometers 38 and 39 shown in the drawings: One such meter, 127, adapted for such use and shown diagrammatically in Fig. 5, comprises an arm 128 which deflects to the right or left as the density of the furnace gas increases and decreases. The arm carries a contact 129, and as the arm 128 deflects in accordance with variations in furnace gas density, it adjusts the contact 129 along a slide wire resistor 47 which may be included in a control system exactly like that shown in Figs. 2 and 3.

Figure 6:
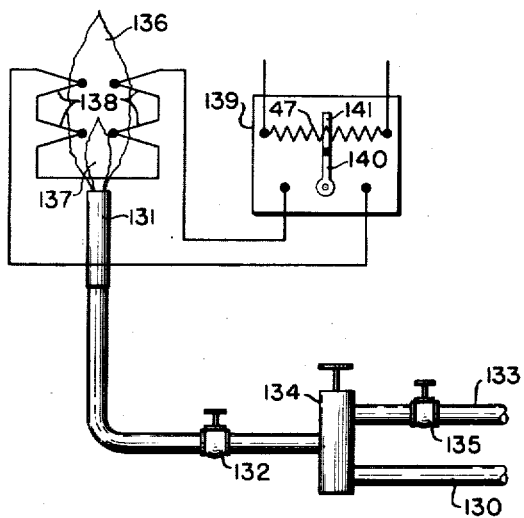
Fig. 6 is a diagrammatic view illustrating another modification of apparatus shown in Fig. 2.

As previously indicated, the flame structure of a burning jet of gas consisting wholly or in substantial part of exit gas from a reducing furnace varies with the reducing character of the furnace atmosphere in such manner as to provide a measurable indication of said capacity which may be used in controlling the operation of the furnace. Thus, as diagrammatically illustrated in Fig. 6, furnace exit gas which may have passed through the conditioning element 36 of Fig. 1 or 126 of Fig. 4, may be passed through a pipe 130 to a burner 131 at a rate controlled by the adjustment of a regulating valve 132. As shown in Fig. 6, the furnace exit gas supplied to the pipe 130 may or may not be mixed with a gas of higher B. t. u. value such as methane, propane or butane, supplied through a pipe 133. A mixing valve 134 is provided to regulate the relative amounts of gas supplied by the pipes 130 and 133 in the mixture passed to the burner 131. The mixture of high B. t. u. gas with the furnace exit gas insures the maintenance of a stronger burner flame than the combustion of the unmixed furnace exit gas will give. When the addition of the high B. t. u. gas is not required, a cutoff valve 135 in the pipe 133 may be closed. In lieu of mixing a high B. t. u. gas with the furnace exit gas the latter may be burned in the presence of less combustion air than is required for complete combustion.

The burned gas discharged by the burner 131 forms a flame comprising a body or outer cone portion 136 and an inner cone portion 137 enveloped by the portion 136. The form, and particularly the length of the flame inner cone 137 changes as a result of changes in the composition of the gas which gives rise to differences in the rate of flame propagation. In particular, an increase or decrease in the hydrogen-carbon dioxide $H_2/CO_2$ ratio will respectively elongate or shorten the inner flame cone 137. The length of that cone, and particularly the relative lengths of the cones 137 and 136 thus provide a reliable indication of the reducing character of the furnace atmosphere.

As shown in Fig. 6, the variations in the relative form of the flame portion 136 and 137 are utilized in a known manner to indicate variations in the composition of the gas supplied to the burner. To this end thermocouples 138 have their hot junctions inserted in the outer envelope portion 136 of the flame at suitably distributed points. As shown, there are four thermocouples 138 and two of them have their hot junctions symmetrically located at opposite sides of the flame axis and at a level which is below the tip of the inner flame cone 137 when the latter is of normal length. The other two thermocouples 138 have their hot junctions symmetrically disposed at opposite sides of the flame axis at a level which is well above the upper end of the inner flame cone 137 when the latter is of normal length.

The four thermocouples 138 are connected in series with one another and with a suitable potential measuring instrument 139. As shown, the thermocouples are thus connected, in series with such references to their respective polarities that the two thermocouples of each pair at the same level act additively on the instrument 139, while the thermocouples at the different levels act differentially on the instrument 139. As shown, the instrument 139 comprises an arm 140 which may be arranged to deflect clockwise or counter-clockwise as a result of an increase or decrease, respectively, in the hydrogen-carbon dioxide ratio of the gas supplied to the burner 131.

As diagrammatically shown in Fig. 6, the arm 140 carries a contact 141 engaging and moving along a slide wire 47. The contact 141 and resistor 47 of Fig. 6 are adapted to coact as do contact 46 and resistor 47 of Fig. 2 in a control system like that shown in Fig. 2 and in such case, the contact 141 and associated resistor 47 are adapted to control the associated furnace in automatic response to the reducing character of the furnace atmosphere as indicated by the flame propagation rate of the furnace exit gas, in the same general manner as the furnace is controlled with the arrangements shown in Figs. 1 and 4 in accordance with variations in the reducing character of the furnace atmosphere indicated by the thermal conductivity of the furnace exit gas.

The means shown diagrammatically in Fig. 6 for analyzing the structure of the burner flame formation is no part of the present invention, but is fully disclosed and claimed in the prior Krogh Patent 2,052,181, granted August 25, 1936, and therefore need not be further illustrated or described herein.

While in accordance with the provisions of the statutes, we have illustrated and described the best forms of embodiment of our invention now known to us, it will be apparent to those skilled in the art that changes may be made in the forms and use of the apparatus disclosed herein, without departing from the spirit of our invention as set forth in the appended claims, and that in some cases certain features of our invention may be used to advantage without a corresponding use of other features.

Having now described our invention, what we claim as new and desire to secure by Letters Patent is:

1. In reducing metallic oxide ore in a blast furnace in which pre-heated air is used as a blast and in which a furnace gas atmosphere including reducing and non-reducing gases is maintained, the method which consists in determining the reducing capacity of the exit gases and passing gaseous material into the furnace at a point above the mantle to correctively modify this reducing capacity in one direction or another in accordance with said determination.

2. In reducing metallic oxide ore in a blast furnace in which pre-heated air is used as a blast and in which the furnace gas atmosphere includes a reducing portion consisting of hydrogen and carbon monoxide and a non-reducing portion including carbon dioxide in amount varying inversely with the amount of carbon monoxide in said reducing portion, the method which consists in determining the reducing capacity of the furnace exit gases which reducing capacity varies in value in one direction or the other as a result of an increase or decrease, respectively, in its hydrogen content, and as a result of a decrease or increase, respectively in its carbon dioxide content and passing gaseous material into the furnace at a point above the mantle to increase or decrease the reducing portion of said exit gases as this reducing capacity varies from a predetermined value thereof in one direction or the other, respectively.

3. In reducing metallic oxide ore in a blast furnace in which pre-heated air is used as a blast and in which a gaseous atmosphere including a reducing portion consisting of hydrogen and carbon monoxide is maintained and from which gas is continuously withdrawn, the method which consists in determining the reducing capacity of the gas withdrawn which is varied in one direction by an increase in its hydrogen content and by an increase in its carbon monoxide content and is varied in the opposite direction and by a decrease in its hydrogen content and by a decrease in its carbon monoxide content, and passing gaseous material into the furnace at a point above the mantle to increase or decrease the reducing portion of the gas withdrawn accordingly as this reducing capacity varies in one direction or the other, respectively from a predetermined amount.

4. The combination with a metallic oxide ore reducing furnace, of means for feeding ore, carbon and hydrogen into the furnace, regulating mechanism adjustable to regulate the reducing capacity of the gas in the furnace and control mechanism including measuring means for measuring a measurable property of said gas which is indicative of the reducing capacity of the gas and also including means for adjusting said regulating mechanism in response to variations in the measurements of said measurable property.

5. The combination with a metallic oxide ore reducing furnace having a furnace chamber with a gas outlet, means for feeding ore, carbon and hydrogen into the furnace chamber, regulating mechanism adjustable to regulate the aggregate hydrogen and carbon monoxide constituents of the gas in the furnace chamber and control mechanism including measuring means for measuring a measurable property of the gas leaving the furnace chamber through said outlet and varying in accordance with variations in the aggregate hydrogen and carbon monoxide constituents of said gas and also including means for adjusting said regulating mechanism in response to variations in the measurements of said measurable property.

6. The combination with a metallic oxide ore reducing furnace of means for supplying solid material including metallic oxide ore and coke to the furnace, means for supplying gaseous material including hydrogen to the furnace, means for preheating gaseous material supplied to the furnace, means for varying the moisture content of the gaseous material supplied to the furnace, and control mechanism including means for measuring a measurable property of the furnace gas which is indicative of the reducing capacity of the furnace atmosphere and also including means for regulating the rates at which carbon and hydrogen are supplied to the furnace and the amounts of moisture and heat in the gaseous material supplied to the furnace in accordance with variations in said reducing capacity.

7. The combination with a metallic oxide ore reducing furnace means for supplying solid material including metallic oxide ore and coke to the the furnace, means for supplying gaseous material including hydrogen to the furnace, means for preheating gaseous material supplied to the furnace, means for varying the moisture content of the gaseous material supplied to the furnace, and control mechanism including measuring means for measuring a measurable property of the gas which is indicative of the aggregate reducing capacity of the hydrogen and carbon monoxide in the furnace atmosphere and also including regulating means controlled by said measuring means for regulating the rates at which carbon and hydrogen are supplied to the furnace and the amounts of moisture and heat in the gaseous material supplied to the furnace in accordance with variations in said reducing capacity from a normal value thereof.

8. In the method of operating a blast furnace which comprises charging into the furnace materials including oxide ore and carbon and introducing a reducing gas into the furnace at a point above the mantle thereof and blowing air through the charge to cause reduction of the ore and to maintain an atmosphere including reducing and non-reducing gases, the steps of controlling the operation of said furnace comprising determining the reducing capacity of the exit gases and correctively modifying this reducing capacity in one direction or the other in accordance with said determination by regulating the introduction of said reducing gas into the furnace.

JOHN R. GREEN.
JOSEPH P. VOLLRATH.

Certificate of Correction

Patent No. 2,395,385. February 19, 1946.

JOHN R. GREEN ET AL.

It is hereby certified that errors appear in the printed specification of the above numbered patent requiring correction as follows: Page 5, second column, line 37, for "ement" read *element*; page 6, first column, line 57, for "Serial No. 510,125" read *Serial No. 510,126*; and that the said Letters Patent should be read with these corrections therein that the same may conform to the record of the case in the Patent Office.

Signed and sealed this 30th day of April, A. D. 1946.

[SEAL]

LESLIE FRAZER,
*First Assistant Commissioner of Patents.* reducing furnace of means for supplying solid material including metallic oxide ore and coke to the furnace, means for supplying gaseous material including hydrogen to the furnace, means for preheating gaseous material supplied to the furnace, means for varying the moisture content of the gaseous material supplied to the furnace, and control mechanism including means for measuring a measurable property of the furnace gas which is indicative of the reducing capacity of the furnace atmosphere and also including means for regulating the rates at which carbon and hydrogen are supplied to the furnace and the amounts of moisture and heat in the gaseous material supplied to the furnace in accordance with variations in said reducing capacity.

7. The combination with a metallic oxide ore reducing furnace means for supplying solid material including metallic oxide ore and coke to the the furnace, means for supplying gaseous material including hydrogen to the furnace, means for preheating gaseous material supplied to the furnace, means for varying the moisture content of the gaseous material supplied to the furnace, and conirol mechanism including measuring means for measuring a measurable property of the gas which is indicative of the aggregate reducing capacity of the hydrogen and carbon monoxide in the furnace atmosphere and also including regulating means controlled by said measuring means for regulating the rates at which carbon and hydrogen are supplied to the furnace and the amounts of moisture and heat in the gaseous material supplied to the furnace in accordance with variations in said reducing capacity from a normal value thereof.

8. In the method of operating a blast furnace which comprises charging into the furnace materials including oxide ore and carbon and introducing a reducing gas into the furnace at a point above the mantle thereof and blowing air through the charge to cause reduction of the ore and to maintain an atmosphere including reducing and non-reducing gases, the steps of controlling the operation of said furnace comprising determining the reducing capacity of the exit gases and correctively modifying this reducing capacity in one direction or the other in accordance with said determination by regulating the introduction of said reducing gas into the furnace.

JOHN R. GREEN.
JOSEPH P. VOLLRATH.

Certificate of Correction

Patent No. 2,395,385.　　　　　　　　　　　　　　　　February 19, 1946.

JOHN R. GREEN ET AL.

It is hereby certified that errors appear in the printed specification of the above numbered patent requiring correction as follows: Page 5, second column, line 37, for "ement" read *element*; page 6, first column, line 57, for "Serial No. 510,125" read *Serial No. 510,126*; and that the said Letters Patent should be read with these corrections therein that the same may conform to the record of the case in the Patent Office.

Signed and sealed this 30th day of April, A. D. 1946.

[SEAL]

LESLIE FRAZER,
*First Assistant Commissioner of Patents.*